United States Patent [19]

Wrobel

[11] Patent Number: 4,801,252

[45] Date of Patent: * Jan. 31, 1989

[54] SLIDE BEARING UNIT FOR SMALL SIZE FAN

[75] Inventor: Guenter Wrobel, Villingen-Schwenningen, Fed. Rep. of Germany

[73] Assignee: Papst-Motoren GmbH & Co. KG, St. Georgen, Fed. Rep. of Germany

[ * ] Notice: The portion of the term of this patent subsequent to May 10, 2005 has been disclaimed.

[21] Appl. No.: 137,945

[22] Filed: Dec. 28, 1987

Related U.S. Application Data

[63] Continuation of Ser. No. 731,880, May 8, 1985, Pat. No. 4,743,173.

[30] Foreign Application Priority Data

May 9, 1984 [DE] Fed. Rep. of Germany ....... 3417127

[51] Int. Cl.⁴ ...................... F04D 29/00; F16C 27/00
[52] U.S. Cl. ................................ 417/354; 417/423.12; 384/219
[58] Field of Search ....................... 384/215, 218, 219; 417/354, 359, 361, 423 R, 423 P

[56] References Cited

U.S. PATENT DOCUMENTS

| 750,362 | 1/1904 | Harrington | 384/218 |
| 2,857,214 | 10/1958 | Kogstrom et al. | 384/219 |
| 3,554,327 | 1/1971 | Takamura | 384/218 |
| 3,629,868 | 12/1971 | Greenlee | 417/361 |
| 3,644,066 | 2/1972 | Heob et al. | 417/354 |
| 3,961,864 | 6/1976 | Papst et al. | 417/354 |

FOREIGN PATENT DOCUMENTS

2016802 2/1981 Fed. Rep. of Germany .
511779 8/1939 United Kingdom ................ 384/218

Primary Examiner—Donald E. Stout
Attorney, Agent, or Firm—Barnes & Thornburg

[57] ABSTRACT

A small fan which is constructed as compact axial fan with a central driving motor retained by way of a flange and a bearing support tube, and in which the housing of the fan forms a flow duct that surrounds the rotor; the bearing support of the shaft of the driving motor is constructed as one-piece slide bearing unit which is secured radially in an axial partial area of the bearing support tube by a sliding seat; the bearing support tube consists of a material which can be injection-molded.

30 Claims, 4 Drawing Sheets

SLIDE BEARING UNIT FOR SMALL SIZE FAN

This application is a continuation of my co-pending application Ser. No. 731,880, filed May 8, 1985 and issued as U.S. Pat. No. 4,743,173, on May 10, 1988.

The present invention relates to a mini-fan of the type disclosed in German Application P 33 40 292 which is constructed as compact axial fan with a central driving motor retained by way of a flange and a bearing support tube and with a rotor secured thereon.

The bearing support of the shaft of the driving motor in such fans takes place in ball bearings or sliding bearings (sleeve bearings) which in their turn are generally held in a bearing support tube. In particular during long periods of operation, at high temperature differences and/or higher rotational speeds, the bearings would become loose in their seats, especially in injection-molded housings, and would cause increasingly operating noises which finally would lead to the requirement that either the entire fan or at least the bearing would have to be exchanged.

This problem exists both with metal housings of alloys of zinc (Zamate), magnesium, aluminum as also with plastic housings; also with materials which exhibit so-called cold flow, or which possess strongly different coefficients of thermal expansions compared to the bearing parts, especially also with plastic materials. The heat due to energy losses of the motor enhances this problem.

It is not possible to realize exactly aligned bearing seats in plastic injection moldings. By reason of the angular displacement of the bearing rings with respect to one another which are possible within limitations, the installation of ball bearings is possible, but of satisfactory quality also only for relatively short periods of operation. With slide bearings, in contrast, the poor alignment cannot be compensated. The bearing seats have to be refinished.

The present invention is concerned with the task to so construct the bearing of a fan of the aforementioned type that a cutting or machining refinishing operation of the bearing seats becomes superfluous, and the preparation of the assembly with the same is itself simple and that axial play or clearance which results in operation is automatically compensated.

The underlying problems are solved according to the present invention in that the bearing support of the shaft of the driving motor is constructed as one-piece slide bearing unit, in that the slide bearing unit is radially fixed in at least an axial partial area of a bearing support tube within the part of the bearing support tube by a slide seat and in that the bearing support tube consists of a material which can be injection-molded. The one-piece slide bearing as sintered bearing offers a particularly large reservoir space for the lubricating oil. The oil is better retained in the pores of the sintered material than in other reservoirs (for example, felt, grease, etc.). For example, felts lose much more rapidly oil during warm-up than sinter bearings.

These and other objects, features and advantages of the present invention will become more apparent from the following description when taken in connection with the accompanying drawing which shows, for purposes of illustration only, several embodiments in accordance with the present invention, and wherein.

Referring now to the drawing wherein like reference numerals are used to designate like parts throughout the various views, the expressions at the top, at the bottom, to the right and left, refer only to the illustrations in the respective figure.

Figure 1:
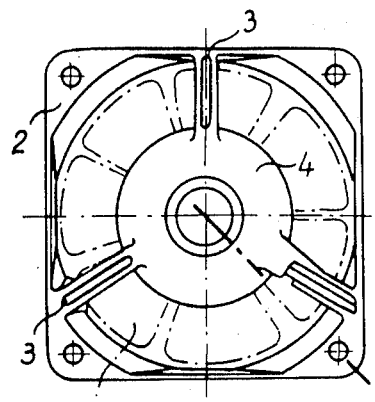
FIG. 1 is an axial plan view on a first embodiment of a fan according to the present invention.
Figure 2:
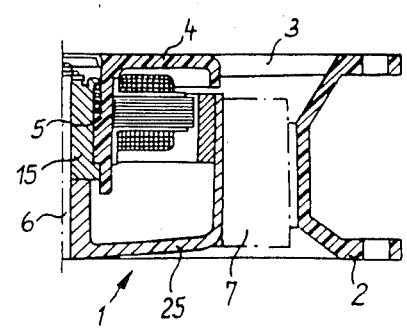
FIG. 2 is a partial cross-sectional view taken along line II—II of FIG. 1.

A fan generally designated by reference numeral 1 (FIGS. 1 and 2) consists of a housing 2, whose webs 3 are connected with a flange 4. A bearing support tube 5 is arranged at the flange 4. Preferably, the housing 1, the webs 2, the flange 4 and the bearing support tube 5 are made in one piece as plastic injection-molded part; however, in certain applications, it may also be constructed as metal die-cast part. A driving shaft 6 (FIG. 2) is securely connected with the rotor of the driving motor. An impeller with blades 7 (shown in FIG. 2 in dash and dotted lines) is secured on the rotor of the driving motor.

Figure 3:
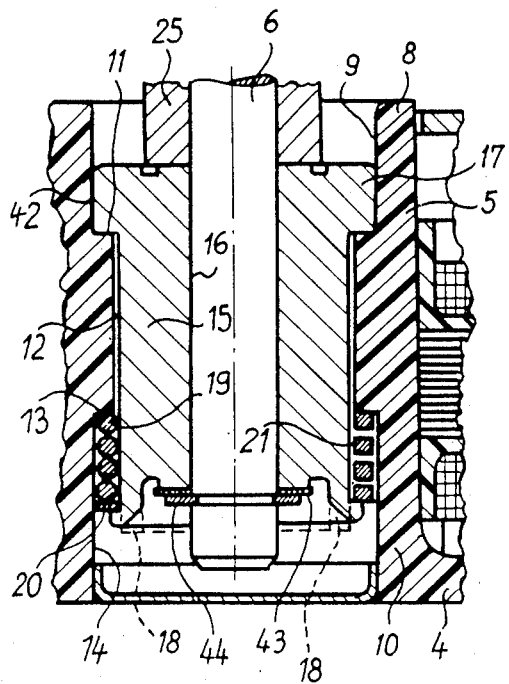
FIG. 3 is a partial cross-sectional view, on an enlarged scale, of a first embodiment of the bearing support of a shaft in a fan according to the present invention.

The bearing support of the shaft 6 is illustrated in FIG. 3 in partial cross-sectional view on an enlarged scale. The bearing support tube 5 is so constructed that it is suited for the installation of slide bearings and of ball bearings. At its upper end 8, the bearing support tube 5 includes a first bearing seat 9 which is followed in the direction toward the lower end 10 by a first shoulder 11, thereafter by a bore 12 with smaller diameter than the bearing seat 9, at a certain axial distance therefrom by a second shoulder 13 and finally by a second bearing seat 14, preferably with the same diameter as the bearing seat 9 in order to be able to install ball bearings in case of need (for example, at very high rotational speeds).

A slide bearing is inserted into the bearing support tube 5 as one-piece, preferably sintered slide bearing unit 15. This bearing unit 15 includes a bearing through-bore 16 which serves as running surface for the shaft 6. At one end face, the bearing unit 15 is provided with an extension 17 whose outer diameter corresponds to that of the bearing seat 9 of the bearing support tube 5, i.e., the extension 17 is installed into the bearing seat with a medium slide seat. This seat provides the radial guidance for the bearing unit 15. At the other end face, the bearing unit 15 is provided with a flange-shaped or upsettable rim 18 (shown in dash and dotted line) which after insertion of the bearing unit 15 into the bearing support tube 5 and after insertion of a spring element 19 or 21 is flanged-over or upset in the radial direction.

This centering extension 17 was located at the bearing support tube end that is adjacent to the side of the bottom of the bell-shaped rotor 25 of the external rotor motor in order to absorb and support the rotary mass having an imbalance.

One side of FIG. 3 (left side) illustrates the use of the spring element which is constructed in this case as coil spring with circular wire cross section. This coil spring 19 abuts with the requisite pressure axially on the one hand at the plane surface 13 of the bearing support tube 5 and on the other at a disk 20 which is retained by the rim 18.

On the right side of FIG. 3, in lieu of the coil spring 19, a corresponding coil spring 21 with square wire cross section is illustrated, whereby it becomes possible by the square cross section to save the disk 20. The spring element 19, 21 fixes the bearing unit 15 in the axial direction, i.e., the spring element 19, 21 is so constructed and designed that the bearing unit 15 is always pressed against the abutment surface of the shoulder 11 also with length changes of the bearing support tube 5 (for example, by temperature or moisture influences). This is of great significance for bearing support tubes of plastic material, however also for bearing support tubes of metal the effects according to the present invention are achieved.

Figure 4:
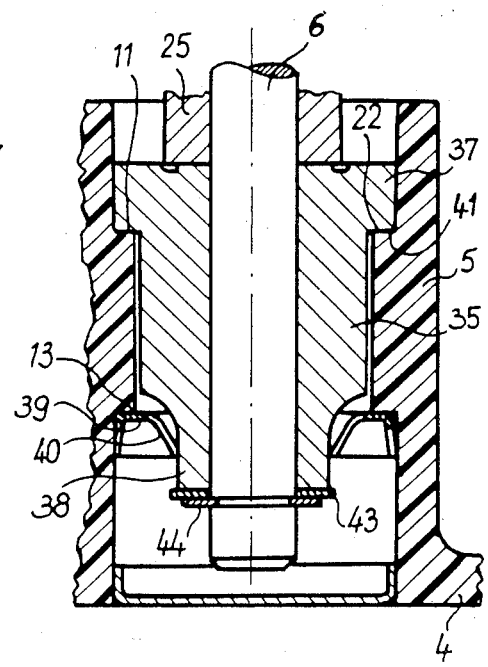
FIG. 4 is a partial cross-sectional view, on an enlarged scale, of a second embodiment of the bearing support of a shaft in a fan according to the present invention.

FIG. 4 illustrates a further embodiment of a slide bearing unit 35 which includes at one end an extension 37 (corresponding to the extension 17 at the bearing unit 15) whereas an extension 38 with smaller outside diameter is provided at the other end. After insertion of the bearing unit 35 into the bearing support tube 5, a locking disk 39 is slipped over the extension 38 up to the plane surface 13 whereby inner segments 40 of the locking disk 39 dig in into the cylindrical surface of the extension 38 and thus secure the axial fixing of the slide bearing unit 35 whereby the locking disk 39 acts correspondingly to the spring elements 19, 21 described above.

One of the following features may be used to prevent rotation:

(a) three or more teeth 41 sintered end-face onto the plane surface 22 which are pressed into the abutment surface of the shoulder 11 when pressing in the bearing unit 15, 35, or (b) similar teeth 42 are provided at the diameter of the bore 9 or (c) the abutment surface of the shoulder 11 is provided with teeth throughout so that the friction is considerably increased.

The shaft is axially secured in one direction by means of a thrust washer 43 and a retaining ring 44 whereas in the opposite direction, the rotor 25 of the driving motor runs up against the bearing unit 15, 35.

Figure 5:
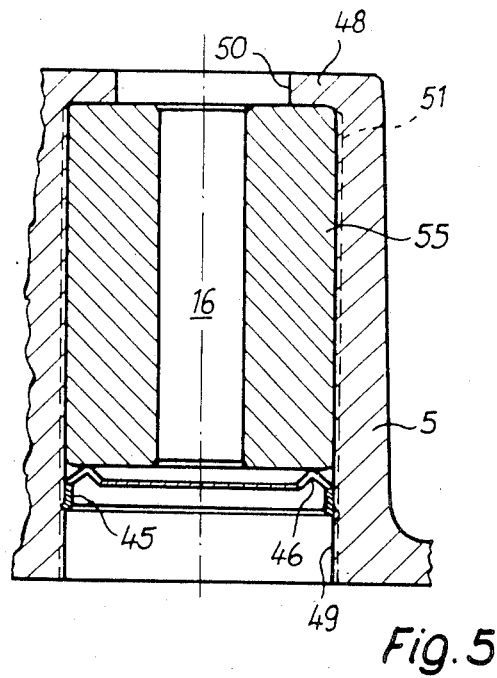
FIGS. 5–8 are partial cross-sectional views through four further embodiments of the bearing support of a shaft in a fan, illustrating the same in a simplified manner.

FIG. 5 illustrates a further possibility to so install a slide bearing unit 55 according to the present invention into an injection-molded housing that dimensional changes of the injection-molded housing (in this case: bearing support tube 5) are automatically compensated and that no cutting or machining finishing operation is necessary as regards manufacture and installation of the bearing support unit. The bearing support tube 5 has a conical bearing seat for injection-molding reasons. Longitudinal ribs 51 (axial parallel ribs) provided at the walls enable a subsequent calibration for establishing a cylindrical bearing seat 49 which is limited in depth by a collar or flange 48. For assembling the shaft 6, a through-opening 50 is provided. After inserting the slide bearing unit 55 into the bearing seat 49 up to the collar or flange 48 (with a medium slide seat), a securing cap 45 is so installed into the bearing seat 49 that, on the one hand, it digs in into the wall of the bearing seat 49 and therewith precludes an axial displacement at this place and that, on the other, spring projections 46 of the retaining cap 45 press the slide bearing unit 55 axially against the collar 48.

Figure 6:
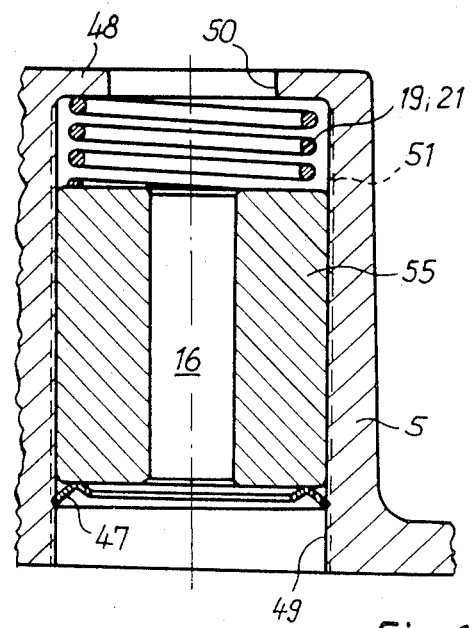

FIG. 6 illustrates an embodiment according to the present invention in which a coil spring 19, 21 is so inserted between the collar or flange 48 and an end face of the slide bearing unit 55 that it exerts an axial pressure on the slide bearing unit 55. A securing element 47 is provided on the opposite end face of the slide bearing unit 55, which engages in the wall of the bearing seat 49 and thus fixes the slide bearing unit 55 from that side. Here, as also in the other above-described embodiments, the bearing support tube 5 consists of a material adapted to be injection-molded or die-cast such as, for example, synthetic resinous material, aluminum or magnesium alloys, Zamak, etc.

The bearing support according to the present invention is of advantage in all those cases where very different coefficients of expansions and other factors such as, for example, shrinkage, cold flow, moisture absorption, etc. occur and this is the case to a high degree with housings injection-molded of plastic material.

By reason of the minimal heat losses with plastic housings, i.e., also plastic bearing support tubes, a collectorless d.c. motor for single or double pulse operation with a so-called auxiliary reluctance moment is provided, particularly advantageously as driving motor, which is due to the fact that the electrodynamic moment from the stator winding includes only one alternating field and the magnetic resistance of the magnetic circuit in the stator area is so changed over the rotary position of the rotor that magnetic energy is stored as long as the electrodynamic moment drives pulse-wise and the stored magnetic energy again becomes free in the pulse gaps by cooperation of the permanent magnet of the rotor with the stator iron under torque formation.

Such motors are described in detail in the DE-AS 22 25 442 and the DE-PS 23 46 380 corresponding to the Swiss Pat. No. 597,715 and in the publication, "asr-digest", Volume 1-2/77, among others. These motors are advantageously external rotor motors, in the rotor of which is arranged a permanent magnet in the form of a permanent magnet ring or a ring-shaped bent permanent magnet band. The magnetization is advantageously trapezoidally shaped or approximately trapezoidally shaped over the pole pitch with a relatively small pole gap. In a similar manner, however, also other permanent magnets may be used, for example, bonded-in half shells or others. The electronics for the control of such a motor (described in the DE-OS No. 30 10 435.9) requires fewer components than customary d.c. motors of this type. It is therefore possible to accommodate also the electronics for the commutation of the motor inside the external dimension of the housing 2, 22 of the fan 1, 21, and more particularly inside of the motor, above all within the area of the flange 4. The European Patent Application No. 82/111882.5 (EU-OS No. 0084156) described a commutator circuit with few elements which can be used very well for that purpose.

In lieu of the already mentioned two-pulse collectorless d.c. motor with auxiliary reluctance moment which is advantageously constructed according to the DE-PS No. 23 46 380, the subject matter of which is incorporated herein by reference, also the operation with a two-pulse collectorless d.c. motor without auxiliary reluctance moment is possible, for example, according to the DE-OS No. 27 30 142 incorporated by reference into this application. Also in conjunction with such a motor, the central bearing tube may be of plastic material and may be injection-molded in one piece with the flange, webs and external housing. However, it is particularly favorable with a two-pulse auxiliary reluctance moment motor because the efficiency thereof is particularly high (especially if constructed according to DE-PS No. 23 46 380) and the heating thereof is correspondingly small so that a relatively high stability of the bearing tube is assured. Similarly, an older driving motor is also advantageous in conjunction with the present invention which also requires only one rotor position sensor that is constructed according to the DE-PS No. 12 76 796.

Figure 7:
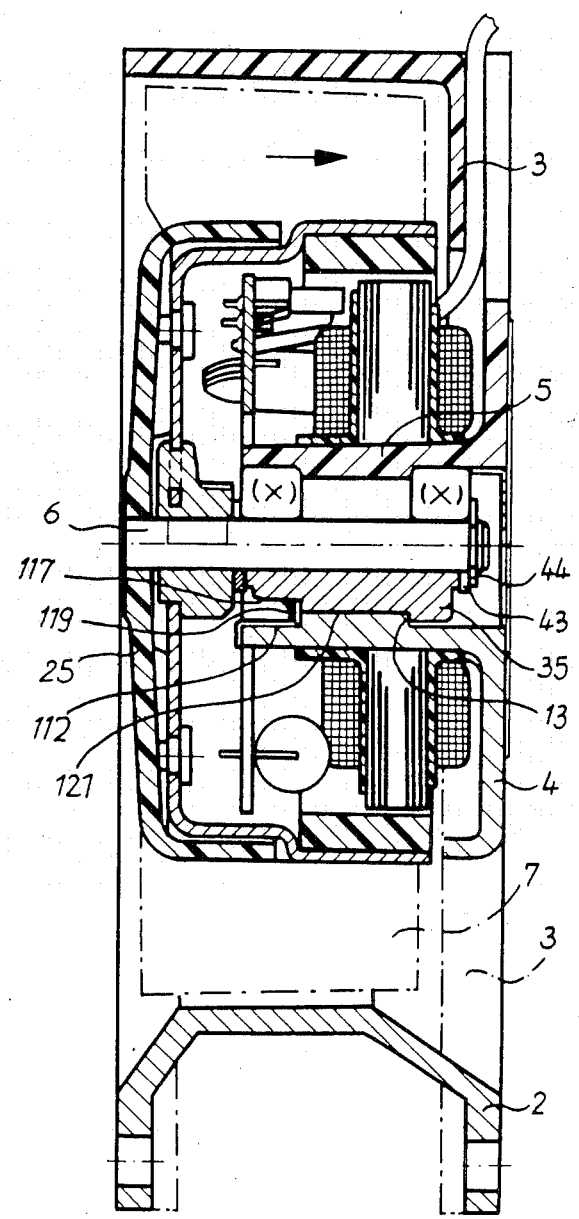

As is apparent, the outer contour of the fan housing has no influence on the stability of the bearing support tube and the accommodation of the commutating electronics on the inside of the motor. FIG. 7 also illustrates a ring-like housing 2, i.e. of the most common form of point symmetrical outer contour. A so-called single pulse motor is described in the DE-OS No. 22 60 069.

Figure 8:
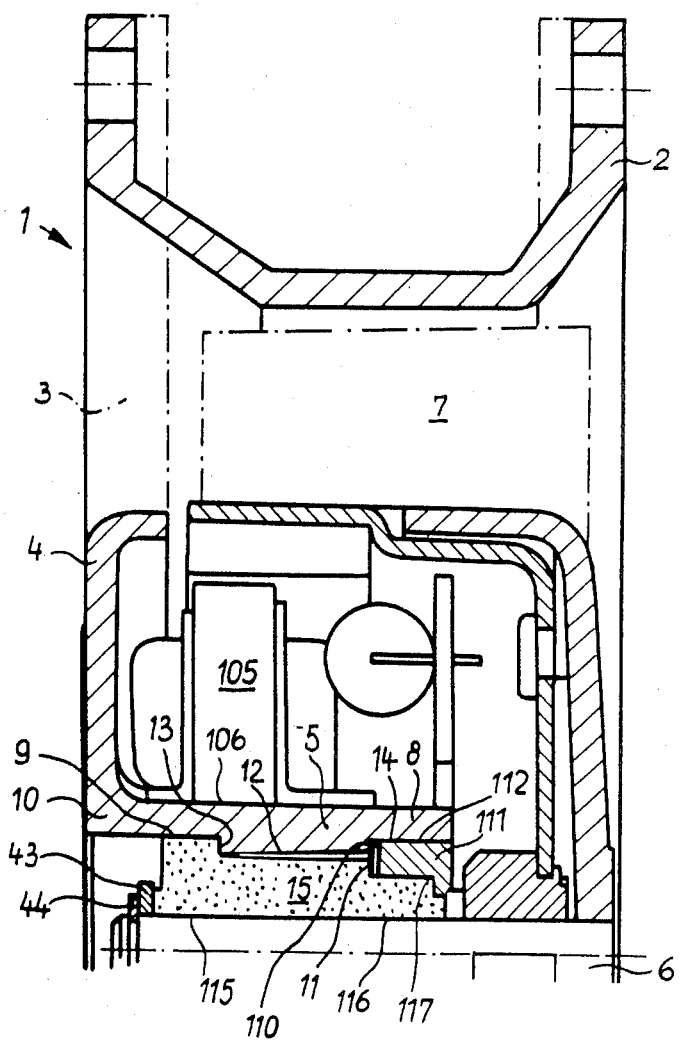

FIG. 8 illustrates an embodiment similar to FIG. 7. The bearing support tube 5 is connected in one-piece to the plastic housing, for example, by way of the flange 4. The stator sheet metal package 105 is seated on the outer surface 106 of the bearing support tube 5. Ball bearings can also be clamped-in in principle with such one-piece plastic bearing housings (such as 2, 3, 4 with plastic bearing tube 5). However, it is decisive that the running surfaces 115 and 116 are aligned well so that the inaccuracy of the injection-molded plastic housing does not have any effect on the bearing quality. The modification of the present invention according to FIG. 8 provides that the bearing unit 15 is inserted into the tube 5 from the flange 4. The plastic bearing tube 5 has a contour as is also suited for ball bearings. The bearing tube 5 has offset end faces 9 and 112 at the places of the steps 13 and 11. It is important in connection therewith that the one-piece sintered bearing body 15 is inserted into the cylinder with the surface 9 having a flush clearance until abutment at the surface 13. The surfaces 106 and 9 should have at least a certain concentricity to one another. If only this is assured, the bearing support of the rotor in the sintered body 15 should pose no problem, at least not with fans having motors of relatively large air gap, for example, two-pulse reluctance moment motors (or other one- or two-pulse collectorless d.c. motors as described above). The sintered bearing body 15 is offset. It includes an intermediate portion with a cylindrical outer surface in its axial center and cylindrical slide surfaces 115 and 116 which may also form a continuous slide bearing surface (aligned from 115 to 116). The surfaces 115 and 116 do not need necessarily to be aligned with one another; however, they must be truly coaxial with one another to a high degree. The sintered bearing ring or tube 15 inserted into the bearing tube 5, after abutment at the shoulder 13, is centered on the opposite side by the shoulder 11 by means of a ring 110 (for example, or Perbunan) and is then secured in the cylindrical recess 112 spaced by way of an intermediate element 111. The element 111 may also be an additional lubricant depot, i.e., may also be a correspondingly constructed porous ring body or it may also be a spring spacer element of the type commercially available as mass-produced component, as illustrated in FIG. 7.

Such a one-piece sintered bearing configuration by means of such a one-piece sintered bearing/plastic bearing support tube of the thus one-piece housing (1 to 4), respectively, also in metal bearing tube housings with inadequately aligned or inadequately coaxial bearing seats, results in an economic solution advantageous in series production which does not require machining operations. The surface 12 would be conical because of the injection techniques whereas the surfaces 9 and 112 could be practically cylindrical; respectively could be made sufficiently accurately cylindrical as bearing seat by non-cutting simple calibration, which takes place without expenditures, especially with the above-described longitudinal grooves in the surface 9. The seat surface 106 also has to be concentric to some extent.

In FIG. 7, the one-piece sintered bearing body 15 is inserted into the bearing support tube 5 from the side of the flange 4 for abutment at the end face 13, whereby the bearing support tube 5 together with the flange 4, the webs 3, the surrounding housing 2—as in the case of FIG. 8 (and also preferably of the other embodiments)—is injection-molded of plastic material. The sliding seat in the cylindrical surface 121 extends to both sides of the axial center of the bearing unit (sintered body 15) approximately over half the axial overall length thereof (15). A collar-like part 119 S-shaped in cross section of spring steel or the like centers the left end of the sintered body 115 in the "bore" 112 and secures the sintered body 115 against non-permissively large axial displacements by digging-in or hooking-in of its radial inner sharp edge into the cylinder surface 117, i.e., in the relatively soft sintered body metal.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A small fan which is constructed as a compact axial fan, comprising a central driving motor means having a rotatable shaft retained by way of a flange means and a bearing support tube means, a rotor secured to the driving motor, and housing means for the fan forming a flow duct that surrounds the rotor, bearing support means for the shaft of the driving motor constructed as a slide bearing means, said slide bearing means being radially fixed at least within an axial partial area of the bearing support tube means by a sliding seat, and wherein said sliding seat is obtained by a spring means acting to produce a bias force between the slide bearing unit and the bearing support tube.

2. A small fan according to claim 1, wherein said bearing support tube means consists of a material that can be molded.

3. A small fan according to claim 2, wherein the driving motor is a collectorless d.c. motor.

4. A fan according to claim 1, wherein the spring means comprises a spring element in the form of a coil spring with square wire cross section, said spring axially abutting with pressure, on the one hand, against a surface of the bearing support tube means and, on the other, against a surface of the slide bearing means.

5. A fan according to claim 1, wherein the spring means comprises a coil spring having a round wire cross section, said spring axially abutting with pressure, on the one hand, against a surface of the bearing support tube means, and on the other, against a disk arranged between a surface of the slide bearing means and the coil spring.

6. A fan according to claim 1, wherein the spring means comprises a spring element in the form of a locking disk which, on the one hand, digs into the outer wall of the slide bearing means and, on the other hand, acts with axial pressure against a surface of the bearing support tube means.

7. A fan according to claim 1, wherein the sliding bearing means includes at least one raised portion at the outer circumference of an extension having a larger diameter.

8. A fan according to claim 1, wherein the sliding bearing means includes at least three raised portions at its plane surface abutting at a shoulder.

9. A fan according to claim 1, wherein the slide bearing means is axially pressed against a collar of the bearing support tube means by means of projections on a securing means acting on said spring means.

10. A fan according to claim 9, wherein the slide bearing means axially abuts, on the one hand, against a securing element and, on the other hand, is acted upon by the spring means comprising an axially effective spring which abuts on one side at the collar and presses on the other side against the slide bearing means.

11. A fan according to claim 1, wherein the driving motor is a collectorless d.c. motor.

12. A fan according to claim 11, wherein the d.c. motor is of the single pulse operation type.

13. A fan according to claim 11, wherein the d.c. motor is of the two-pulse operation type.

14. A fan according to claim 1, wherein the slide bearing means is acted upon by the spring means axially against an abutment with the force of at least one spring element.

15. A fan according to claim 1, wherein the slide bearing means is secured against axial displacement by a securing element which form-lockingly engages into its outer surface.

16. A fan according to claim 1, wherein the slide bearing means is secured against axial displacement by way of an element which acts radially on the same by means of a force-locking connection.

17. A fan with a rotor hub according to claim 1, wherein the axial partial area is located in the area of one end of the bearing support tube means which is adjacent the rotor hub.

18. A fan according to claim 17, wherein said one end is adjacent the bottom of a bell-shaped external rotor.

19. A fan according to claim 17, wherein at least one of said spring means and of securing element is provided within the area of the other end of the bearing support tube means.

20. A fan according to claim 19, wherein said at least one of said spring means and securing element is provided on the other side of the flange.

21. A fan according to claim 1, wherein the partial area is located about in the axial center of the bearing support tube means.

22. A fan according to claim 1, wherein at least one of said spring means and a securing element is provided within the area of the end of the bearing support tube means axially opposite the flange.

23. A fan according to claim 21, wherein the partial area extends from about the center up to the opposite end of the bearing support tube means.

24. A fan according to claim 23, wherein a radial inwardly extending flange is provided at the opposite end of the bearing support tube means, on which the slide bearing means is axially supported.

25. A fan according to claim 24, wherein the slide bearing means is axially supported at said flange under interposition of said spring means acting in an axial direction.

26. A fan according to claim 1, wherein the partial area is provided in the axial end area of the bearing support tube means adjacent the flange.

27. A fan according to claim 1, wherein the bearing support tube means is constructed as one-piece plastic injection-molded part together with the fan housing means by means of webs and the flange.

28. A fan according to claim 1, wherein the spring means axially abuts with pressure against a surface of the bearing support tube means and against a surface of the slide bearing means.

29. A fan according to claim 1, wherein the spring means axially abuts with pressure against a surface of the bearing support means and against a disk arranged between a surface of the slide bearing means and the spring means.

30. A fan according to claim 1, wherein the spring means comprises a spring element in the form of a locking disk which, on the one hand, digs into the outer wall of the slide bearing means and, on the other hand, acts with pressure against a surface of the bearing support tube means.

* * * * *